Figure 1:
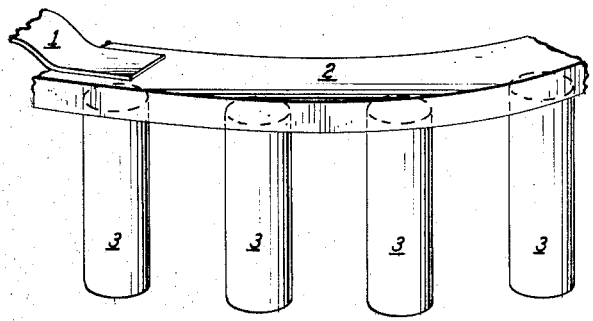

April 5, 1966     P. GALVIN ETAL     3,244,508
PROCESS AND APPARATUS FOR THE PRODUCTION OF METALLIC
PRODUCTS WITH VERY LOW CARBON CONTENT
Filed April 27, 1961

INVENTORS
PAUL GALVIN
AIME PERRON

BY

ATTORNEY

United States Patent Office 3,244,508
Patented Apr. 5, 1966

3,244,508
PROCESS AND APPARATUS FOR THE PRODUCTION OF METALLIC PRODUCTS WITH VERY LOW CARBON CONTENT
Paul Galvin and Aimé Perron, Chedde, France, assignors to Pechiney, Compagnie de Produits Chimiques et Electrometallurgiques, Paris, France, a corporation of France
Filed Apr. 27, 1961, Ser. No. 106,061
Claims priority, application France, May 2, 1960, 825,930
3 Claims. (Cl. 75—10)

The present invention which results from applicants' researches relates to improvements in processes using metallurgical electric furnaces and, more particularly, electric furnaces having their electrodes in series, as for example, Heroult or Girod furnaces.

The invention also relates, more particularly, to electric furnaces used for the production of pure metals or super-refined alloys, for example, ferroalloys having a very low carbon content. However, the invention is also of great interest in the refining or remelting of liquid metals or alloys.

Additionally, the invention concerns furnaces used for the electro-metallothermic (electro-aluminothermic, electro-silicothermic) production of metals or alloys free of impurities.

The invention also comprehends as novel industrial products electric furnaces which embody the improvement of the present invention and also the novel electrodes provided in said furnaces. The invention also comprehends the process for operating the furnaces provided with the novel electrodes according to the invention.

Up to the present time, it has been difficult to produce pure metals or super-refined alloys in the electric furnace because of the fact that the carbon of the graphitized electrodes reacted or formed an alloy with the resultant metal or alloy.

For example, it is known that, notwithstanding the care taken in their production, some ferroalloys will always contain carbides, oxy-carbides and other impurities, thereby often rendering their use difficult. Moreover, the smooth operation of the furnaces is hindered by such addition of carbon which contaminates the slag and causes very high metal losses.

By using, for example, open-hearth ("affinage sur sole") refining methods, it has been found possible to decrease—to some extent—the objectionable carbon content by operating the furnaces with an open arc ("arc libre"); however, in addition to the slowness of the operations and their energy costs, this method of operation causes appreciable nitriding of the produced metal or alloy so that, in addition to the metallic carbides or oxy-carbides—though present in small quantities—the finished product contains nitrides.

Resort has previously also been had to processes consisting in preliminary melting the ore in an electric furnace, and thereafter carrying out the reaction outside the furnace by dispersing the reducing agent in the ore. However, this process—the application of which entails some dangers—leads to high energy consumption and does not completely prevent the nitriding reactions.

The present invention eliminates these drawbacks and enables the production of homogeneous metals or alloys free of impurities, with decidedly higher yields and under better safety conditions than heretobefore.

The present invention comprises a process for the production of metallic alloys with very low carbon content, preferably, of the ferroalloy type, by metallothermic reduction of their oxide ores in an electric furnace wherein the electrodes are constituted of any metal or alloy which does not practically contain any carbon, and the melting point of which is preferably higher than about 800 to 1000° C. Further, according to the invention, said electrodes do not dip substantially into the molten bath being treated, the electric voltage of the arc being regulated so as to obtain a very short open arc and so that the said electrodes are only slightly consumed in the course of the process.

According to the invention, one can select for the production of said electrodes either a metal or alloy in the form of cast, forged, or rolled bars, as well as sintered, briquetted, divided, powdered, or scrap metals, or else, even metals in the state of slags or ores.

According to a special feature of the invention, the metal or alloy which forms the novel electrode is chosen in such a way that said metal or alloy enters into the composition of the metal or alloy which is to be produced in the electric furnace.

According to one embodiment of the invention, the metal of which the electrode is formed is the same as the principal metal of the alloy to be produced. Thus, in the production of ferroalloys, there are advantageously used iron electrodes the controlled fusion of which, in the bath, causes only a relatively very small addition of iron to the alloy.

According to another embodiment of the invention, there is selected for the electrode a metal which forms a small proportion only of the alloy to be produced. The said metal can then be added to the bath, in whole or in part, by the consumption of the electrode itself, so that the exact composition of the alloy being produced can be permanently determined as a function of the electrode consumption or, more simply, as a function of the duration of the treatment.

In a preferred embodiment of the invention, the metallic electrodes are consittuted of a metal or alloy having the same composition as the metal or alloy to be prepared in the electric furnace. According to this particular embodiment, the duration of the treatment has no effect on the composition of the finished product, and production can be carried out without taking into account the consumption, whether high or low, of the electrodes, thereby securing great uniformity in the quality of the produced metals or alloys.

Although, as has been stated above, the new invention makes it possible to overcome the drawbacks, present until now, by external additions brought about by the consumption of the electrodes, it is, nevertheless, advantageous in some cases to limit such consumption, for example, in order to render electrode replacements less frequent; such control of the consumption is especially useful in the case when the fusion of the electrodes is used as a means for proportioning the composition of the alloy to be produced.

According to the invention, a reduced and readily controllable consumption of the novel metallic electrodes is obtained when operating the furnace at the limit of the open arc, with the electrodes operating flush with the bath or, preferably, even slightly immersed in the bath. If the voltage be too high, operation with an arc causes rapid consumption of the electrode which melts in the arc; if, on the contrary, the voltage be too low, then, excessive consumption of the electrodes occurs through their fusion in the bath.

According to another feature of the invention, it is advantageous to use for the new electrodes metals or alloys free of impurities and, especially, free of carbon. Such provision not only makes it possible to reduce contamination of the metal produced in the furnace, but it also brings about a considerable decrease in the consumption of the electrodes.

By way of example, it can be mentioned that an iron electrode containing 0.15% carbon used in the preparation of a ferroalloy, was consumed twice as fast as an electrode made of extra mild (dead soft) steel containing 0.05% carbon, and used under identical conditions.

An even better efficiency and even smaller electrode consumptions are obtained in a furnace equipped according to the invention with metallic electrodes, if the furnace be charged in the vicinity of the electrodes and in such a way that the raw materials form a sloping pile ("talus") around said electrodes; this special arrangement makes it possible to depart still more from open arc operation.

In a preferred embodiment of the invention, the metallic electrode is divided into several elementary electrodes of relatively reduced cross-sections which are electrically connected in parallel to one another. Each electrode is thus formed of a plurality of bars, preferably identical, spaced from each other a distance which is, for example, about equal to the width of said elementary bars.

According to a practical embodiment, the said bars or elementary electrodes are welded onto a common metallic part, such as a circular plate which, depending on the circumstances, is cooled and which serves as the current inlet.

In the case where the novel electrodes are used in a high power furnace, each electrode can be divided into a fairly large number, for example, between 5 and 10, bars or elementary electrodes. In that case, the electrode according to the invention takes on the appearance of a squirrel cage and it is advantageous to leave, between two elementary bars, a greater space than the average distance between the other bars, thereby providing an opening in the cage.

According to a charging procedure, particularly adapted to a furnace equipped according to the invention, the entire amount or a part of the raw materials are charged inside the electrode-cages through the above described opening. The slope ("talus") of the raw material pile is thus formed at the very center of the electrodes, thereby ensuring optimum operation of the furnace.

It will be understood that the good results obtained with high power furnaces by dividing the metallic electrodes into several elementary electrodes, results from the natural cooling which operates on said elementary electrodes. The temperature of the metal is thus lowered and the electrode consumption is reduced.

It can be mentioned, by way of example, that in the case of three-phase furnaces, the power of which does not exceed 300 to 400 kw., it is possible to use massive metallic undivided electrodes having a cross-section of the order of 150 cm.$^2$ in the case of iron electrodes.

In the case of larger powers, the electrode is divided into elements having, for example, unit cross-sections of the order of 100 to 150 cm.$^2$ (in the case of iron electrodes); in such a case, it is convenient to use (adopt) the standard cross-sections of commercial billets. It is obvious that the subdivision of the electrode is greater when the metal chosen for the electrode has a low melting point.

The various above-described characteristics of the new metallic electrodes cooperate in the production in the electric furnace of high purity metals and alloys with reduced electrode consumption. For example, ferrotitanium has been produced by electro-aluminothermy from titanium oxide in a furnace equipped, according to the invention, with iron electrodes; the specific consumption of electrodes was of the order of 100 to 200 kg. per ton alloy, that is to say, about 150 g. iron per kw./hr.

Of course, it is possible, without departing from the scope of the invention, to use electrode cooling systems other than the above-described natural cooling through the subdivision into elementary electrodes. For example, one can provide forced cooling of the electrodes by ventilation or water circulation.

The novel electrodes, according to the invention, primarily find advantageous applications in the production of pure metals or alloys prepared in the electric furnace by aluminothermy or silicothermy, such as—and without this listing being limiting in any way—pure chromium, manganese, tungsten, molybdenum, super-refined ferrochromium having a very low carbon content, titanium-aluminum, ferrotitanium, ferro-mischmetal, ferrovanadium, ferroniobium, ferrotantalum, various ferroalloys, etc., but they can also be used in electrical steel-making with a view of preventing carbide formation in high quality steels.

It is equally possible to treat, in furnaces equipped with electrodes according to the invention, metal-rich slags from electric furnaces without running any risk of carbiding or nitriding the recovered alloy; such is the case, for example, of metals such as: vanadium, niobium, tantalum, titanium, pure chromium, etc.

From what has been above described, it is obvious that the electrodes can be made of the most different metals or alloys, but preferably of those having a melting point above about 800 to 1000° C., such as, for example and without limitation, iron, copper, titanium, refractory steels, nickel, chromium, or an alloy of these metals, etc.

Without departing from the scope of the invention, the new metallic electrodes can consist of divided (particulate) metallic elements, powder, scraps, ore slags, etc., charged continuously or intermittently into a metallic casing (skirt) made of a metal which can be tolerated in or which enters into the composition of the metal being produced.

The metallic elements charged into the casing can be preliminarily compressed or packed, or else, agglomerated with a more or less conductive binder. It will be understood that the electrode, which is only a semi-conductor at its upper part because of the subdivision of the metallic elements, becomes more and more electrically conductive towards its lower end which is at a high temperature. Means are provided inside the casing to prevent the sudden ("inopinée") descent of the charged substances, and other means make it possible to extend (lengthen) the casing at the top as it is consumed; this arrangement provides continuous metallic electrodes.

It is to be understood that the invention is in no way limited to the particular examples described; the invention is capable of numerous variations according to its application without departing from its scope.

Figure 2:
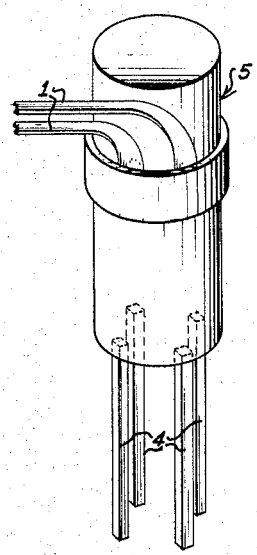

In order to further illustrate the invention, reference is made to the accompanying drawing, in which:

FIGURE 1 is a perspective view of one embodiment of a divided electrode according to the invention, for use with a three-phase current supply, and FIGURE 2 is a perspective view of another embodiment of a divided electrode for use with a single-phase current.

Referring to FIGURE 1, 1 designates the current inlet, 2 designates the metallic support or plate to which are welded the several elementary electrodes 3. The metallic support is slightly incurved so that each of the elementary electrodes 3 are at the same distance from the center of the furnace crucible.

As stated above, FIGURE 2 relates to an electrode for use with a single-phase current. Elementary electrodes 4 are welded to the support 5.

By: "a very low carbon content" as used in the specification and claims, is understood an amount not in excess of about 0.05% weight, of carbon, and, preferably, not more than 0.03% in weight, of carbon.

By: "a very short open arc" is understood an arc length not superior to 10 mm. and preferably not superior to 5 mm., by the way of an automatic current regulation, said regulation system being known in itself.

What is claimed is:

1. Process of producing metallic products of very low carbon content by an electrothermic treatment in an electric arc furnace, comprising the following steps: providing said furnace with electrodes comprising metallic material substantially free of carbon and having a melting point above the range of about 800° C., supplying a charge to the furnace, supplying electric power to the furnace to melt the charge, and maintaining the electrode tips by current regulation substantially flush with the molten slag bath surface whereby the electrodes are only slightly consumed in the course of the process.

2. Process according to claim 1, wherein the charge is introduced to form a naturally sloping pile against and about the electrode.

3. In an electric arc furnace having a furnace, electrodes within the furnace, said electrodes comprising metallic material substantially free of carbon and having a melting point above the range of about 800° C., means for supplying a charge to the furnace, means for supplying electric power to the electrodes to melt the charge, and means for maintaining the electrode tips by current regulation substantially flush with the molten slag surface within the furnace whereby the electrodes are only slightly consumed during operation of the furnace, the improvement in which the electrodes comprise a plurality of parallel, spaced elementary units of reduced cross-section connected in parallel to a common terminal.

References Cited by the Examiner

UNITED STATES PATENTS

| | | | |
|---|---|---|---|
| 892,211 | 6/1908 | Becket | 75—11 |
| 2,303,973 | 12/1942 | Armstrong | 75—10 |
| 2,523,092 | 9/1950 | Bryk | 75—11 |
| 2,651,569 | 9/1953 | Loewen et al. | 75—10 |
| 2,769,705 | 11/1956 | Sem | 75—10 |
| 2,813,921 | 11/1957 | Vordahl et al. | 75—10 |
| 2,830,890 | 4/1958 | Udy | 75—11 |

DAVID L. RECK, *Primary Examiner.*

MARCUS U. LYONS, ROGER L. CAMPBELL, WINSTON A. DOUGLAS, *Examiners.*